(12) United States Patent
Ferber

(10) Patent No.: US 8,949,030 B2
(45) Date of Patent: Feb. 3, 2015

(54) ATTENUATING SEA-SURFACE GHOST WAVE EFFECTS IN SEISMIC DATA

(75) Inventor: Ralf Ferber, Horsham (GB)

(73) Assignee: WesternGeco L.L.C., Houston, TX (US)

(*) Notice: Subject to any disclaimer, the term of this patent is extended or adjusted under 35 U.S.C. 154(b) by 577 days.

(21) Appl. No.: 13/194,403

(22) Filed: Jul. 29, 2011

(65) Prior Publication Data

US 2013/0030709 A1    Jan. 31, 2013

(51) Int. Cl.
    G01V 1/34   (2006.01)
    G01V 1/38   (2006.01)
    G01V 1/36   (2006.01)

(52) U.S. Cl.
    CPC .......... *G01V 1/36* (2013.01); *G01V 1/3808* (2013.01); *G01V 2210/52* (2013.01); *G01V 1/38* (2013.01); *G01V 2210/56* (2013.01)
    USPC ............................................. 702/16; 367/21

(58) Field of Classification Search
    USPC .......... 702/14–18; 367/21, 38, 47, 49, 50–52, 367/63
    See application file for complete search history.

(56) References Cited

U.S. PATENT DOCUMENTS

| | | | |
|---|---|---|---|
| 3,673,556 A | 6/1972 | Biggs | |
| 4,353,121 A * | 10/1982 | Ray et al. | 367/21 |
| 4,486,863 A | 12/1984 | French | |
| 4,657,482 A | 4/1987 | Neal | |
| 4,958,328 A | 9/1990 | Stubblefield | |
| 4,992,991 A | 2/1991 | Young et al. | |
| 4,992,992 A | 2/1991 | Dragoset, Jr. | |
| 5,319,609 A | 6/1994 | Regnault | |
| 5,596,547 A * | 1/1997 | Bancroft et al. | 367/51 |
| 5,715,213 A | 2/1998 | Allen | |
| 6,024,344 A | 2/2000 | Buckley et al. | |
| 6,088,297 A | 7/2000 | Stottlemyer | |
| 6,151,556 A | 11/2000 | Allen | |
| 6,477,711 B1 | 11/2002 | Freeman et al. | |
| 6,493,636 B1 | 12/2002 | DeKok | |
| 6,671,223 B2 | 12/2003 | Bittleston | |
| 6,678,207 B2 | 1/2004 | Duren | |
| 6,684,160 B1 | 1/2004 | Ozbek et al. | |
| 6,932,017 B1 | 8/2005 | Hillesund et al. | |
| 7,080,607 B2 | 7/2006 | Hillesund et al. | |

(Continued)

FOREIGN PATENT DOCUMENTS

| | | |
|---|---|---|
| GB | 2081446 | 2/1982 |
| GB | 2303705 | 2/1997 |

(Continued)

OTHER PUBLICATIONS

International Search Report and Written Opinion of PCT Application No. PCT/US2012/048759 dated Oct. 18, 2012: pp. 1-7.

(Continued)

*Primary Examiner* — Manuel L Barbee

(57) ABSTRACT

A method for processing seismic data. The method includes receiving the seismic data acquired by at least two receivers that are disposed at different depths. The method may then time-align the seismic data, collect a portion of the time-aligned seismic data into a gather and sum the collected time-aligned seismic data in the gather. After summing the collected time-aligned seismic data in the gather, the method may widen a spectrum of the summed seismic data and generate an image of subsurface formations in the earth based on the widened spectrum.

20 Claims, 8 Drawing Sheets

(56) References Cited

U.S. PATENT DOCUMENTS

| | | |
|---|---|---|
| 7,104,728 B2 | 9/2006 | Luc et al. |
| 7,293,520 B2 | 11/2007 | Hillesund et al. |
| 7,417,924 B2 | 8/2008 | Vigen et al. |
| 7,660,189 B2 | 2/2010 | Vigen et al. |
| 2004/0044480 A1* | 3/2004 | Wood .............................. 702/17 |
| 2006/0158660 A1* | 7/2006 | Luttge et al. .................. 356/511 |
| 2006/0227657 A1 | 10/2006 | Tveide et al. |
| 2006/0239117 A1 | 10/2006 | Singh et al. |
| 2008/0285381 A1 | 11/2008 | Moldoveanu et al. |
| 2008/0316859 A1 | 12/2008 | Welker et al. |
| 2009/0067285 A1 | 3/2009 | Robertsson et al. |
| 2009/0213691 A1* | 8/2009 | Christie et al. .................. 367/43 |
| 2010/0060286 A1 | 3/2010 | Summerfield et al. |
| 2010/0118645 A1 | 5/2010 | Welker |
| 2010/0142317 A1 | 6/2010 | Moldoveanu et al. |
| 2010/0238762 A1 | 9/2010 | Hornbostel |
| 2011/0044131 A1 | 2/2011 | Thornton et al. |
| 2012/0140592 A1 | 6/2012 | Robertsson et al. |
| 2012/0213033 A1 | 8/2012 | Soubaras |
| 2012/0224454 A1 | 9/2012 | Soubaras |
| 2013/0028045 A1 | 1/2013 | Ferber |

FOREIGN PATENT DOCUMENTS

| | | |
|---|---|---|
| GB | 2320706 | 7/1998 |
| GB | 2379741 | 3/2003 |
| WO | 2007006785 | 1/2007 |

OTHER PUBLICATIONS

International Search Report and Written Opinion of PCT Application No. PCT/US2012/048761 dated Oct. 18, 2012: pp. 1-7.

Soubaras, "Deghosting by joint deconvolution of a migration and a mirror migration," SEG Denver Annual Meeting, 2010: pp. 3406-3410.

* cited by examiner

ATTENUATING SEA-SURFACE GHOST WAVE EFFECTS IN SEISMIC DATA

CROSS-REFERENCE TO RELATED APPLICATION

This application is related to U.S. patent application Ser. No. 13/194,447, titled, "Seismic Survey Designs for Attenuating Sea-Surface Ghost Wave Effects in Seismic Data," filed on Jul. 29, 2011, which is incorporated herein by reference.

BACKGROUND

1. Field of the Invention

Implementations of various techniques described herein generally relate seismic data processing.

2. Description of the Related Art

The following descriptions and examples do not constitute an admission as prior art by virtue of their inclusion within this section.

In a typical seismic survey, a plurality of seismic sources, such as explosives, vibrators, airguns or the like, may be sequentially activated near the surface of the earth to generate energy (i.e., seismic waves) which may propagate into and through the earth. The seismic waves may be reflected back by geological formations within the earth, and the resultant seismic wave field may be sampled by a plurality of seismic receivers, such as geophones, hydrophones and the like. Each receiver may be configured to acquire seismic data at the receiver's location, normally in the form of a seismogram representing the value of some characteristic of the seismic wave field against time. The acquired seismograms or seismic data may be transmitted wirelessly or over electrical or optical cables to a recorder system. The recorder system may then store, analyze, and/or transmit the seismic data. This data may be used to generate and image of subsurface formations in the earth and may also be used to detect the possible presence of hydrocarbons, changes in the subsurface formations and the like.

In a marine seismic survey, seismic data typically include up-going waves that are reflected off of the surface of the earth and down-going waves that are reflected from the sea surface. The up-going waves may be used to detect the possible presence of hydrocarbons, changes in the subsurface and the like. The down-going waves (i.e., sea-surface ghost waves), however, may destructively interfere with the up-going waves at certain frequencies such that the up-going waves are completely canceled out of the seismic data.

SUMMARY

Described herein are implementations of various technologies and techniques for attenuating the effects of sea-surface ghost waves in seismic data. In one implementation, a technique for attenuating the effects of sea-surface ghost waves may include receiving the seismic data acquired by at least two receivers that are disposed at different depths. The method may then include time-aligning the seismic data, collecting a portion of the time-aligned seismic data into a gather and summing the collected time-aligned seismic data in the gather. After summing the collected time-aligned seismic data in the gather, the method may then widen a spectrum of the summed seismic data and generate an image of subsurface formations in the earth based on the widened spectrum.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1A:
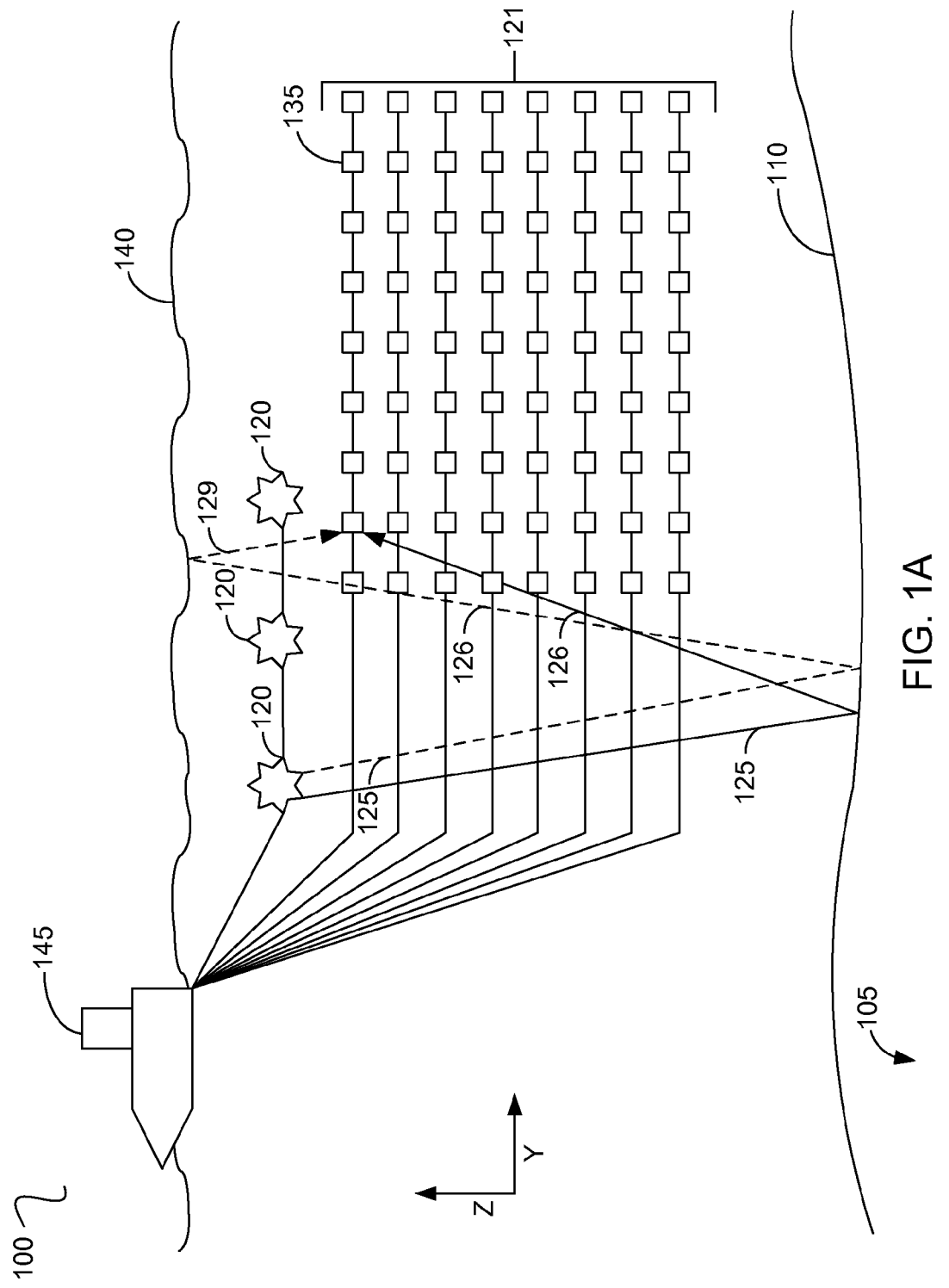
FIG. 1A illustrates a side view of a marine-based survey of a subterranean subsurface in accordance with one or more implementations of various techniques described herein.
Figure 1B:
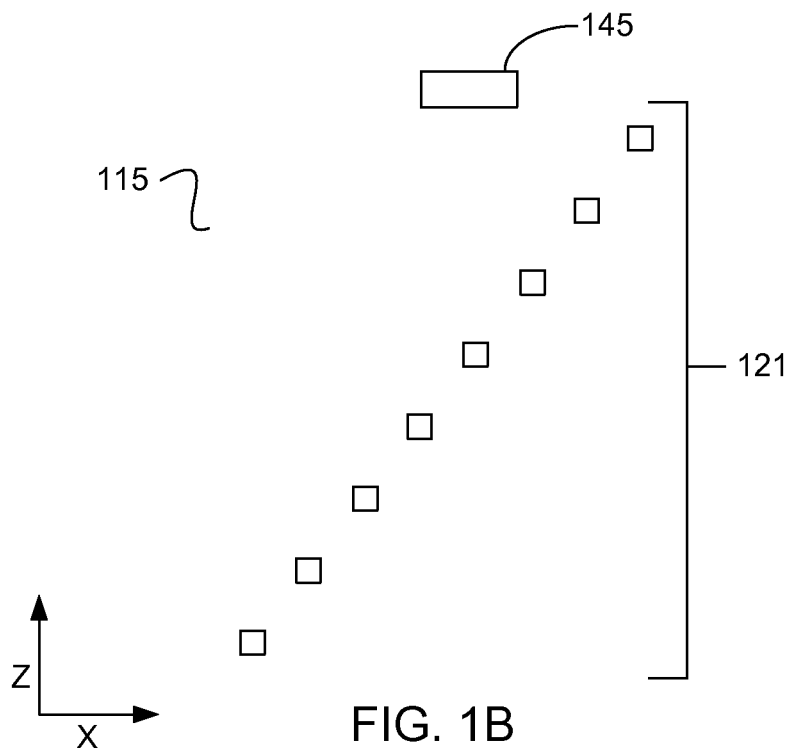
FIG. 1B illustrates a rear view of a marine-based survey of a subterranean subsurface in accordance with one or more implementations of various techniques described herein.
Figure 1C:
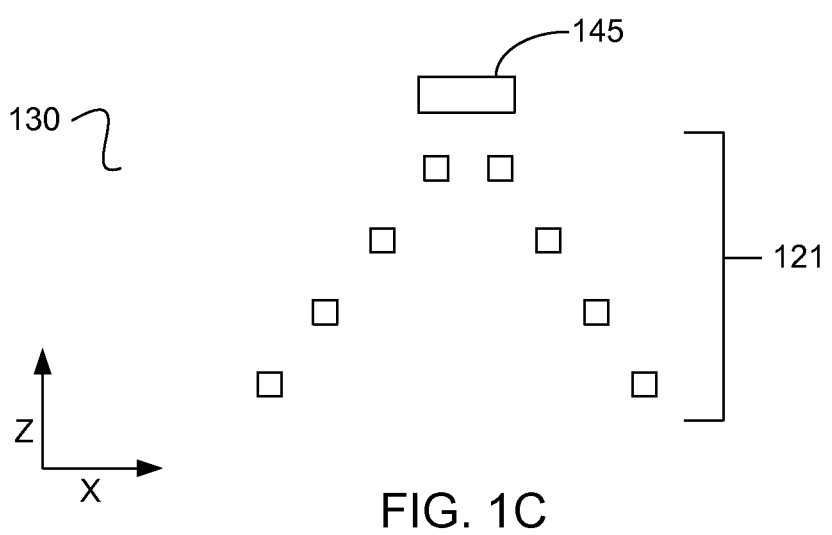
FIG. 1C illustrates a rear view of a marine-based survey of a subterranean subsurface in accordance with one or more implementations of various techniques described herein.
Figure 1D:
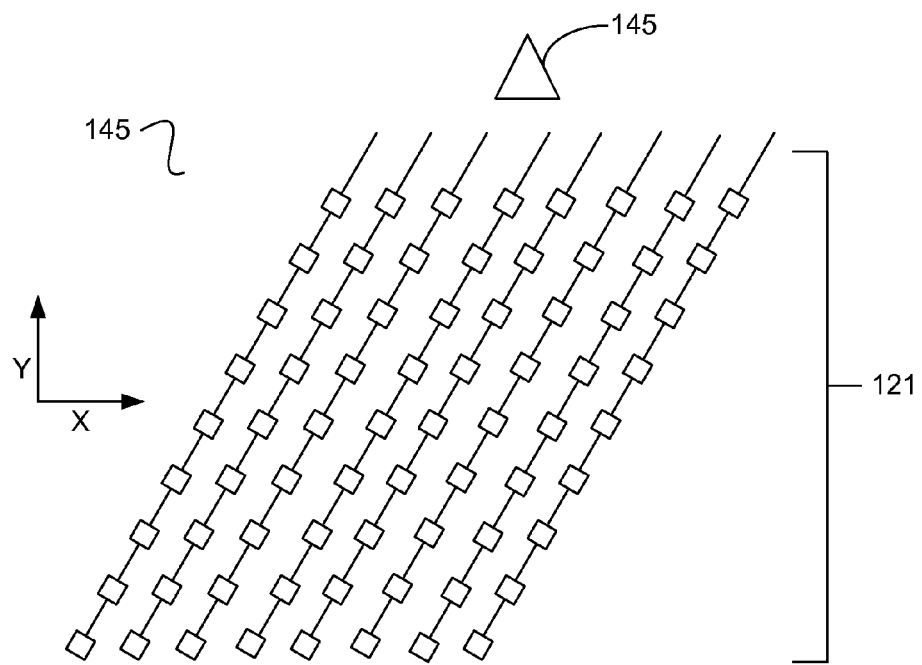
FIG. 1D illustrates an aerial view of a marine-based survey of a subterranean subsurface in accordance with one or more implementations of various techniques described herein.
Figure 1E:
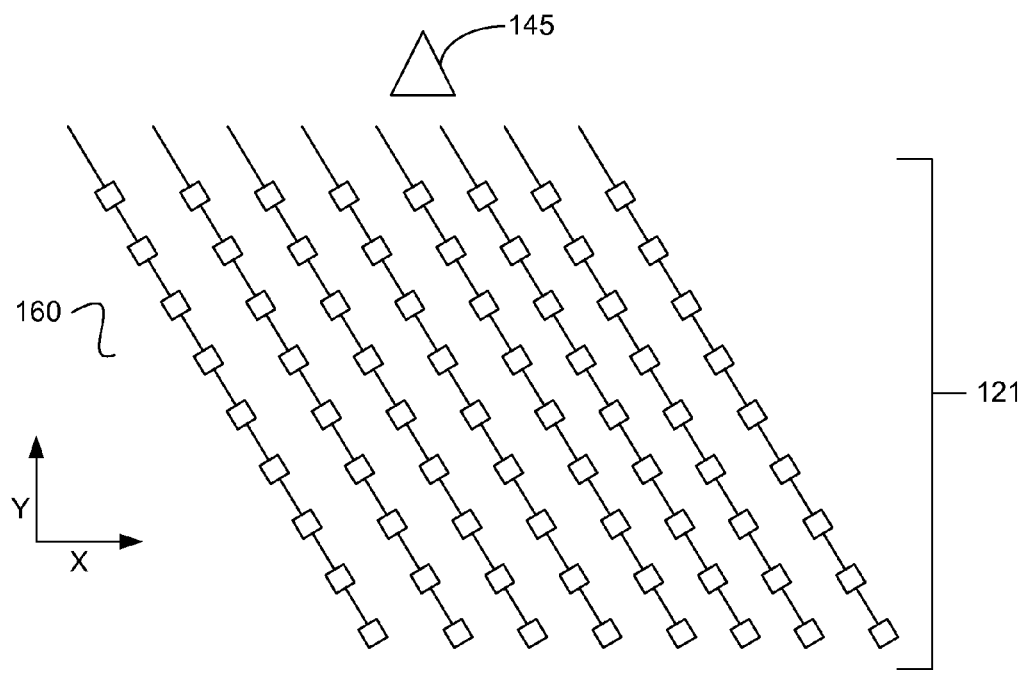
FIG. 1E illustrates an aerial view of a marine-based survey of a subterranean subsurface in accordance with one or more implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide a brief summary of various technologies and techniques directed at attenuating the effects of sea-surface ghost waves in seismic data in accordance with one or more implementations described herein. The seismic data may be acquired using a variety of survey configurations. In one implementation, streamers that include seismic receivers may be towed at various depths. For instance, each streamer may be towed at a different depth such that the streamers are arranged in an order of increasing or decreasing depth from left to right. Alternatively, the streamers may be arranged in a symmetric manner such that the two middle streamers are towed at the same depth, and the next two streamers outside the middle streamers are towed at the same depth that is deeper than the middle streamers, and so on.

In addition to towing streamers at different depths, each streamer may be towed at a slant from the inline direction, while preserving a constant streamer depth.

In another implementation, the streamers towed at the various depths and slant described above may also be towed to follow circular tracks to perform a coil survey.

After acquiring the seismic data using the survey configurations described above, a computer application may perform a time alignment on the acquired seismic data. Since the seismic data are acquired from receivers disposed on streamers that are towed at different depths, the time alignment may correct the seismic data for being acquired at different depths.

The computer application may then collect a portion of the seismic data into one or more summation contribution gathers. A summation contribution gather may be defined as a portion of the seismic data that may be added together and processed in a manner that would result in a single data trace that corresponds to the acquired seismic data.

After obtaining the summation contribution gathers, the computer application may then sum the portion of the seismic data (i.e., the traces) in the summation contribution gathers to generate seismic data that have residual ghost wavelets without deep frequency notches (i.e., without sea-surface ghost waves that destructively interfere with the up-going waves).

The computer application may then apply a suitable spectral shaping filter, for example a zero-phase Wiener deconvolution filter, to the summed seismic data to widen the seismic data amplitude spectrum. As a result, the computer application may use the filtered seismic data to obtain a sub-surface image that approximates the image that would be acquired by imaging only up-going waves in the seismic data, without performing an explicit wavefield separation into up- and down-going waves.

One or more implementations of various techniques for attenuating the effects of sea-surface ghost waves in seismic data will now be described in more detail with reference to FIGS. 1A-3 and in the following paragraphs.

Survey Configurations

FIGS. 1A-1I illustrate various survey configurations that may be implemented in accordance with various techniques described herein.

Multiple Streamer/Multiple Depth Survey Configuration

FIG. 1A illustrates a side view of a marine-based survey 100 of a subterranean subsurface 105 in accordance with one or more implementations of various techniques described herein. Subsurface 105 includes seafloor surface 110. Seismic sources 120 may include marine vibroseis sources, which may propagate seismic waves 125 (e.g., energy signals) into the Earth over an extended period of time or at a nearly instantaneous energy provided by impulsive sources. The seismic waves may be propagated by marine vibroseis sources as a frequency sweep signal. For example, the marine vibroseis sources may initially emit a seismic wave at a low frequency (e.g., 5 Hz) and increase the seismic wave to a high frequency (e.g., 80-90 Hz) over time.

The component(s) of the seismic waves 125 may be reflected and converted by seafloor surface 110 (i.e., reflector), and seismic wave reflections 126 may be received by a plurality of seismic receivers 135. Seismic receivers 135 may be disposed on a plurality of streamers (i.e., streamer array 121). The seismic receivers 135 may generate electrical signals representative of the received seismic wave reflections 126. The electrical signals may be embedded with information regarding the subsurface 105 and captured as a record of seismic data.

In one implementation, each streamer may include streamer steering devices such as a bird, a deflector, a tail buoy and the like. The streamer steering devices may be used to control the position of the streamers in accordance with the techniques described herein. The bird, the deflector and the tail buoy is described in greater detail with reference to FIG. 1G below.

In one implementation, seismic wave reflections 126 may travel upward and reach the water/air interface at the water surface 140, a majority portion of reflections 126 may then reflect downward again (i.e., sea-surface ghost waves 129) and be received by the plurality of seismic receivers 135. The sea-surface ghost waves 129 may be referred to as surface multiples. The point on the water surface 140 at which the wave is reflected downward is generally referred to as the downward reflection point.

The electrical signals may be transmitted to a vessel 145 via transmission cables, wireless communication or the like. The vessel 145 may then transmit the electrical signals to a data processing center. Alternatively, the vessel 145 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 135. In one implementation, the seismic data may be processed to generate a seismic image of the subsurface 105.

Typically, marine seismic acquisition systems tow each streamer in streamer array 121 at the same depth (e.g., 5-10 m). However, marine based survey 100 may tow each streamer in streamer array 121 at different depths such that seismic data may be acquired and processed in a manner that avoids the effects of destructive interference due to sea-surface ghost waves. For instance, marine-based survey 100 of FIG. 1A illustrates eight streamers towed by vessel 145 at eight different depths. The depth of each streamer may be controlled and maintained using the birds disposed on each streamer. In one implementation, streamers can be arranged in increasing depths such that the leftmost streamer is the deepest streamer and the rightmost streamer is the shallowest streamer or vice versa. (See FIG. 1B).

Alternatively, the streamers may be arranged in a symmetric manner such that the two middle streamers are towed at the same depth; the next two streamers outside the middle streamers are towed at the same depth that is deeper than the middle streamers and so on. (See FIG. 1C). In this case, the streamer distribution would be shaped as an inverted V. Although marine survey 100 has been illustrated with eight streamers, in other implementations marine survey 100 may include any number of streamers.

In addition to towing streamers at different depths, each streamer of a marine-based survey may be slanted from the inline direction, while preserving a constant streamer depth. (See FIG. 1D and FIG. 1E). In one implementation, the slant of each streamer may be obtained and maintained using the deflector and/or the tail buoy disposed on each streamer. The angle of the slant may be approximately 5-6 degrees from the inline direction. The angle of the slant may be determined based on the size of the subsurface bins. A subsurface bin may correspond to a certain cell or bin within the subsurface of the earth, typically 25 m long by 25 m wide, where seismic surveys acquire the seismic data used to create subsurface images. In this manner, the slant angle may be larger for larger subsurface bin sizes and may be smaller for smaller subsurface bin sizes. The slant may be used to acquire seismic data from several locations across a streamer such that sea-surface ghost interference may occur at different frequencies for each receiver.

Multiple Streamer/Multiple Depth Coil Survey Configuration

In another implementation, streamers may be towed at different depths and towed to follow circular tracks such as that of a coil survey. (See FIGS. 1F, 1H & 1I). In one implementation, the coil survey may be performed by steering a vessel in a spiral path (See FIG. 1I). In another implementation, the coil survey may be performed by towing multiple vessels in a spiral path such that a first set of vessels tow just sources and a second set of vessels tow both sources and streamers. The streamers here may also be towed at various depths. For instance, the streamers may be arranged such that the leftmost streamer is the deepest streamer and the rightmost streamer is the shallowest streamer, or vice versa. The streamers may also be arranged such that they form a symmetrical shape (e.g., inverted V shape). Like the implementations described above, each streamer of the coil survey may also be slanted approximately from the inline direction, while preserving a constant streamer depth. Additional details with regard to multi-vessel coil surveys may be found in U.S. Patent Application Publication No. 2010/0142317, and in the discussion below with reference to FIGS. 1F-1G.

Figure 1F:
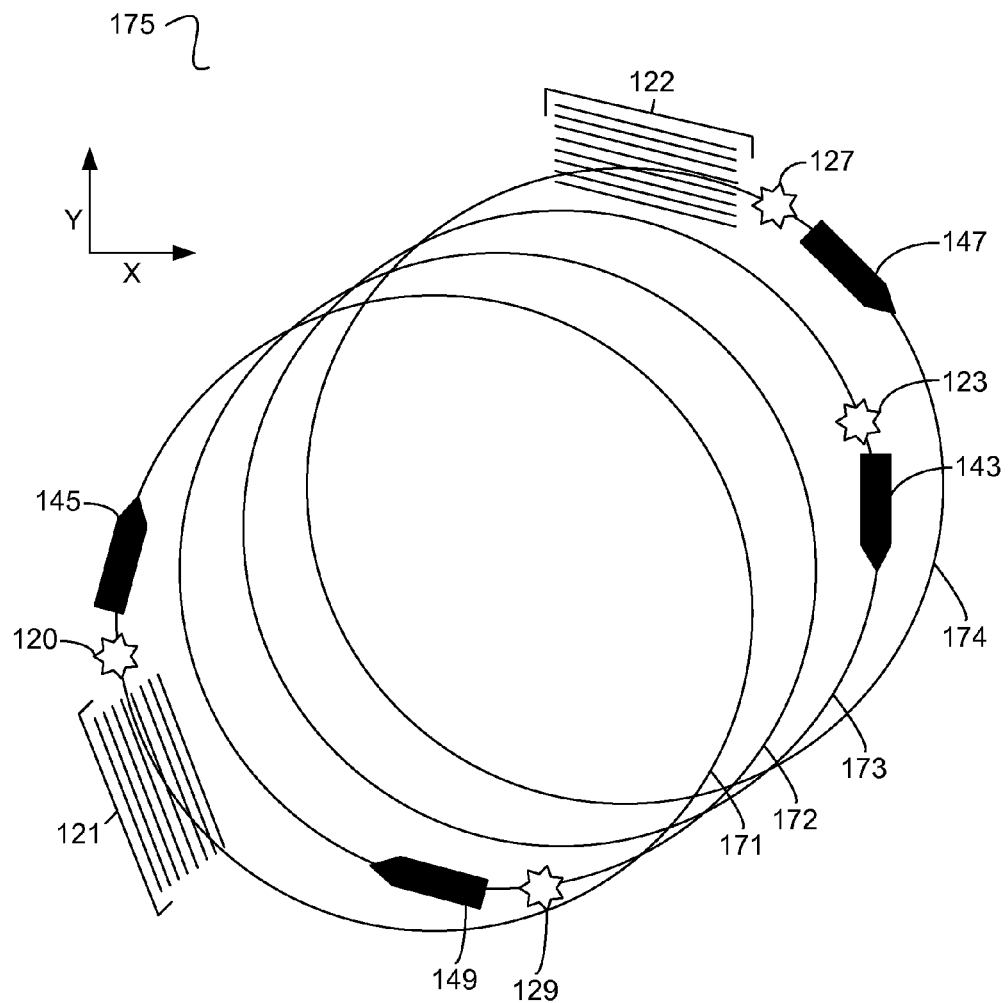
FIG. 1F illustrates an aerial view of a multi-vessel marine-based coil survey of a subterranean subsurface in accordance with one or more implementations of various techniques described herein.

FIG. 1F illustrates an aerial view of a multi-vessel marine-based coil survey 175 of a subterranean subsurface in accordance with one or more implementations of various techniques described herein. Coil survey 175 illustrated in FIG. 1F is provided to illustrate an example of how a multi-vessel coil survey 175 may be configured. However, it should be understood that multi-vessel coil survey 175 is not limited to the example described herein and may be implemented in a variety of different configurations.

Coil survey 175 may include four survey vessels 143/145/147/149, two streamer arrays 121/122, and a plurality of sources 120/123/127/129. The vessels 145/147 are "receiver vessels" in that they each tow one of the streamer arrays 121/122, although they also tow one of the sources 120/127. Because the receiver vessels 145/147 also tow sources 120/127, the receiver vessels 145/147 are sometimes called "streamer/source" vessels or "receiver/source" vessels. In one implementation, the receiver vessels 145/147 may omit sources 120/127. Receiver vessels are sometimes called "streamer only" vessels if they tow streamer arrays 121/122 and do not tow sources 120/127. Vessels 143/149 are called "source vessels" since they each tow a respective source or source array 123/129 but no streamer arrays. In this manner, vessels 143/149 may be called "source only" vessels.

Each streamer array 121/122 may be "multicomponent" streamers. Examples of suitable construction techniques for multicomponent streamers may be found in U.S. Pat. Nos. 6,477,711, 6,671,223, 6,684,160, 6,932,017, 7,080,607, 7,293,520, and U.S. Patent Application Publication 2006/0239117. Any of these alternative multicomponent streamers may be used in conjunction with the techniques described herein.

Figure 1G:
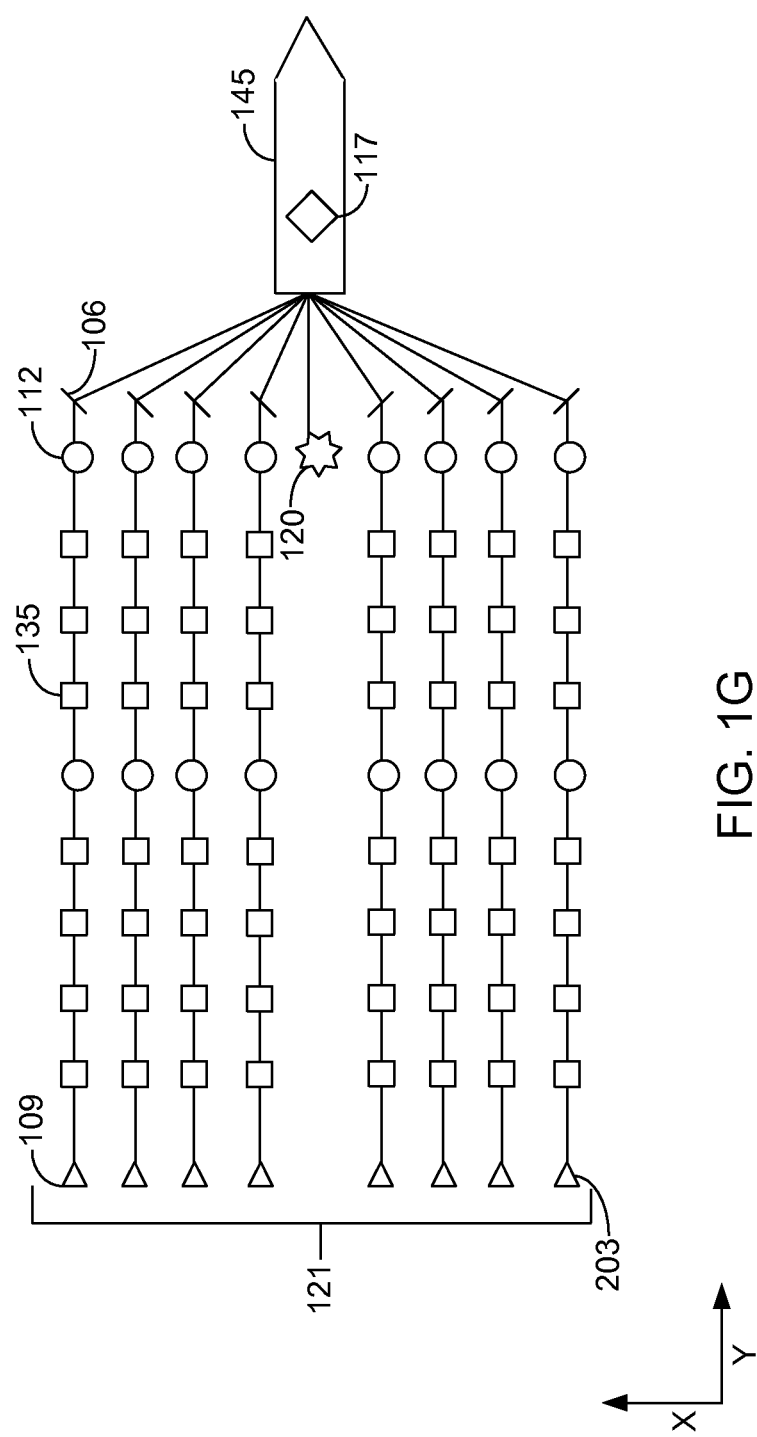
FIG. 1G illustrates an aerial view of a streamer array in a marine-based coil survey in accordance with one or more implementations of various techniques described herein.

FIG. 1G illustrates an aerial view of a streamer array 121 in a marine-based coil survey 175 in accordance with one or more implementations of various techniques described herein.

Vessel 145 may include computing apparatus 117 that controls streamer array 121 and source 120 in a manner well known and understood in the art. The towed array 121 may include any number of streamers. In one implementation, a deflector 106 may be attached to the front of each streamer. A tail buoy 109 may be attached at the rear of each streamer. Deflector 106 and tail buoy 109 may be used to help control the shape and position of the streamer. In one implementation, deflector 106 and tail buoy 109 may be used to actively steer the streamer to the slant as described above with reference to FIGS. 1D-1E.

A plurality of seismic cable positioning devices known as "birds" 112 may be located between deflector 106 and tail buoy 109. Birds 112 may be used to actively steer or control the depth at which the streamers are towed. In this manner, birds 112 may be used to actively position the streamers in various depth configurations such as those described above with reference to FIGS. 1B-1C.

In one implementation, sources 120 may be implemented as arrays of individual sources. As mentioned above with reference to FIG. 1A, sources 120 may include marine vibroseis sources using any suitable technology known to the art, such as impulse sources like explosives, air guns, and vibratory sources. One suitable source is disclosed in U.S. Pat. No. 4,657,482. In one implementation, sources 120 may simultaneously propagate energy signals. The seismic waves from sources 120 may then be separated during subsequent analysis.

In order to perform a coil survey (e.g., FIG. 1F/1H), the relative positions of vessels 143/145/147/149, as well as the shapes and depths of the streamers 121/122, may be maintained while traversing the respective sail lines 171-174 using control techniques known to the art. Any suitable technique known to the art may be used to control the shapes and depths of the streamers such as those disclosed in commonly assigned U.S. Pat. Nos. 6,671,223, 6,932,017, 7,080,607, 7,293,520, and U.S. Patent Application Publication 2006/0239117.

As shown in FIG. 1F, the shot distribution from multi-vessel coil shooting is not along one single circle, but along multiple circles. The maximum number of circles is equal to the number of vessels. The pattern of shot distribution may be random, which may be beneficial for imaging and multiple attenuation. Design parameters for multi-vessel coil shooting may include the number of streamers, the streamer separation, the streamer length, the circle radius, the circle roll in X and Y directions, the number of vessels and the relative location of the vessels relative to a master vessel. These parameters may be selected to optimize data distribution in offset-azimuths bins or in offset-vector tiles, and cost efficiency. Those skilled in the art having the benefit of this disclosure will appreciate that these factors can be combined in a number of ways to achieve the stated goals depending upon the objective of and the constraints on the particular survey.

Although the vessel and streamers of FIG. 1F are illustrated as traveling in a generally circular path, in other implementations the vessel and streamers may be steered to travel in a generally oval path, a generally elliptical path, a FIG. 8 path, a generally sine curve path or some combination thereof.

In one implementation, WesternGeco Q-Marine technology may provide features such as streamer steering, single-sensor recording, large steerable calibrated source arrays, and improved shot repeatability, as well as benefits such as better noise sampling and attenuation, and the capability to record during vessel turns. Each vessel 143/145/147/149 may include a GPS receiver coupled to an integrated computer-based seismic navigation (TRINAV™), source controller (TRISOR™), and recording (TRIACQ™) system (collectively, TRILOGY™),. In one implementation, sources 120 may be TRISOR™-controlled multiple air gun sources.

Figure 1H:
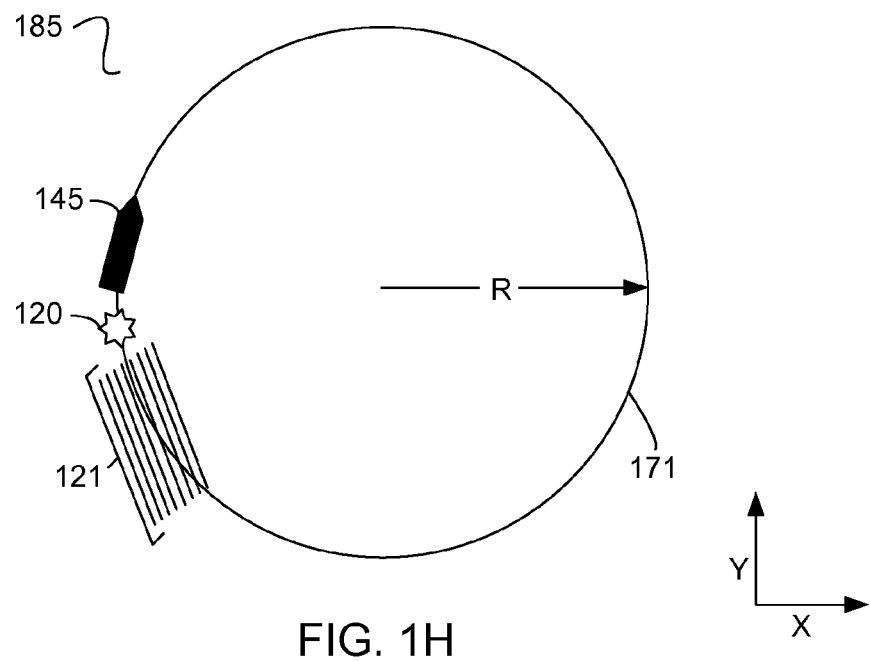
FIG. 1H illustrates an aerial view of a single vessel marine-based coil survey of a subterranean subsurface in accordance with one or more implementations of various techniques described herein.

Although FIGS. 1F-1G have been described using multiple vessels to perform a coil survey, in other implementations, the coil survey may be performed using a single vessel as described in commonly assigned U.S. Patent Application Publication No. 2008/0285381. An aerial-view of an implementation of a single vessel marine-based coil survey 185 is illustrated in FIG. 1H.

In a single vessel marine-based coil survey 185, vessel 145 may travel along sail line 171 which is generally circular. Streamer array 121 may then generally follow the circular sail line 171 having a radius R.

Figure 1I:
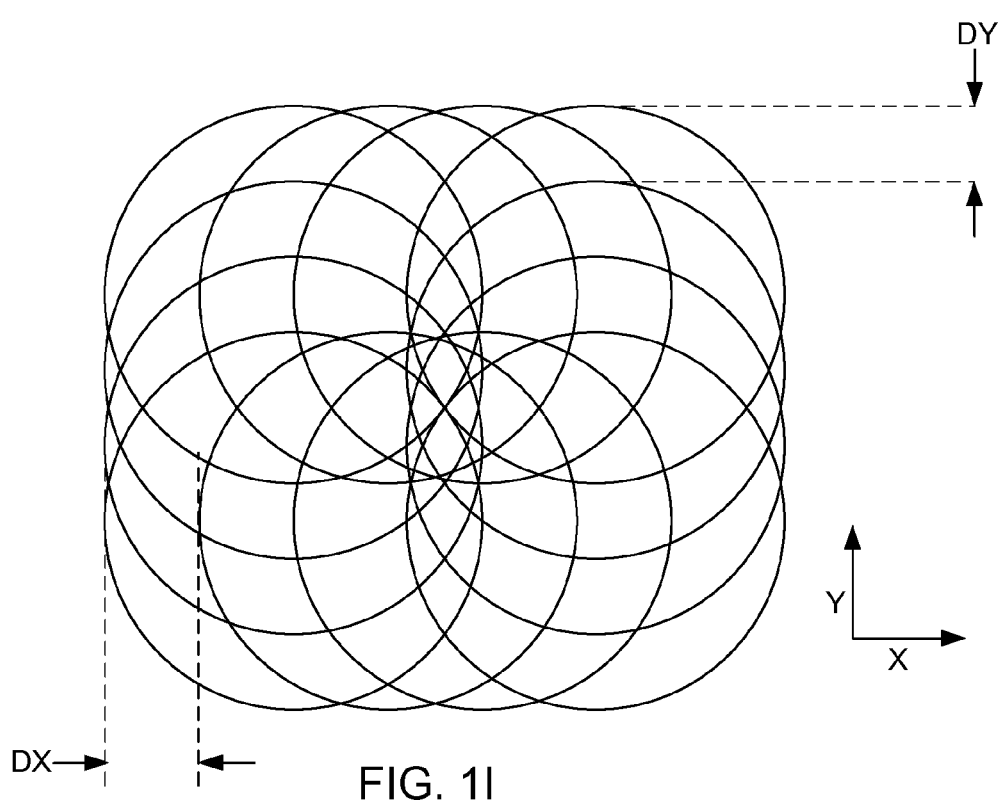
FIG. 1I is a computerized rendition of a plan view of the survey area covered by a coil survey as performed in accordance with one or more implementations of various techniques described herein.

In one implementation, sail line 171 may not be truly circular once the first pass is substantially complete. Instead, vessel 145 may move slightly in the y-direction (vertical) value of DY, as illustrated in FIG. 1I. Vessel 145 may also move in the x-direction (horizontal) by a value DX. Note that "vertical" and "horizontal" are defined relative to the plane of the drawing.

FIG. 1I is a computerized rendition of a plan view of the survey area covered by the generally circular sail lines of the coil survey as performed by a multi-vessel marine-based coil survey or a single vessel marine based coil survey over time during a shooting and recording survey. The displacement from circle to circle is DY in the vertical direction and DX in the horizontal direction. As shown in FIG. 1I, several generally circular sail lines cover the survey area. For a single vessel marine-based coil survey, the first generally circular sail line may have been acquired in the southeast corner of the survey. When a first generally circular sail path is completed, vessel 145 may move along the tangent with a certain distance, DY, in vertical direction, and starts a new generally circular path. Several generally circular curved paths may be acquired until the survey border is reached in the vertical direction. A new series of generally circular paths may then be acquired in a similar way, but the origin will be moved with DX in the horizontal direction. This way of shooting continues until the survey area is completely covered.

The design parameters for practicing a single vessel marine-based coil survey may include the radius R of the circle (the radius being a function of the spread width and the coverage fold desired), DY (the roll in the y-direction), and DX (the roll in the x-direction). DX and DY are functions of streamer spread width and of the coverage fold desired to be acquired. The radius R of the circle may be larger than the radius used during the turns and is a function of the streamer spread width. The radius R may range from about 5 km to about 10 km. In one implementation, the radius R ranges from 6 km to 7 km.

Attenuating Sea-Surface Ghost Waves

Figure 2:
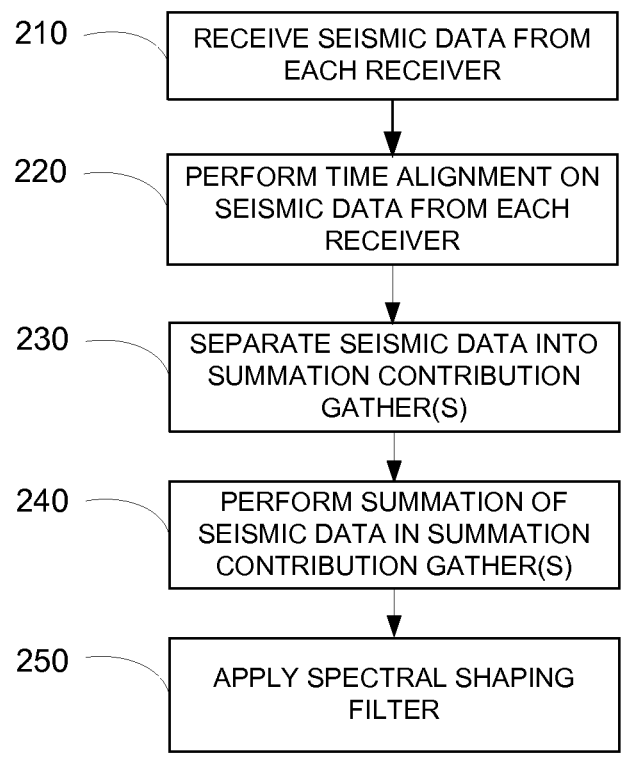
FIG. 2 illustrates a flow diagram of a method for attenuating effects of sea-surface ghost waves in seismic data in accordance with implementations of various technologies described herein.

FIG. 2 illustrates a flow diagram of a method 200 for attenuating sea-surface ghost waves in seismic data in accordance with implementations of various technologies described herein. In one implementation, method 200 may be performed by a computer application. It should be understood that while method 200 indicates a particular order of execution of operations, in some implementations, certain portions of the operations might be executed in a different order.

At step 210, the computer application may receive seismic data acquired by seismic receivers in a seismic survey. The seismic survey may be in any manner as described above with reference to FIGS. 1A-1I. As such, the seismic data may be acquired at different depths.

At step 220, the computer application may perform a time alignment on the seismic data acquired from each receiver in the seismic survey. The computer application may perform the time alignment because the receivers where the seismic data were acquired are located at different depths. For instance, the seismic data acquired by receivers located on a shallow streamer may indicate a peak at a different time as compared to seismic data acquired by receivers located on a deeper streamer for the same seismic waves that have been reflected off of the subsurface. The time alignment corrects for the misalignment of the seismic data due to the streamers being at different depths such that the seismic data may be processed accordingly.

In one implementation, time alignment may be performed by transforming a full waveform upward (or downward) continuation to a common streamer depth, which may be the shallowest streamer. However, the common streamer depth (e.g., virtual streamer) may be located at any depth including at the sea-surface. The full waveform transformation may be applied to all of the traces recorded by an individual streamer behind the vessel per shot (common-source gather). As such, the seismic data acquired from each receiver may be time aligned such that all of the seismic data acquired by all of the receivers in the seismic survey would have been acquired from receivers at the same depth, e.g., at sea-surface.

In another implementation, the time alignment may be performed by applying simple time shift corrections such that the corrections are similar to receiver static corrections for land seismic data. In this manner, each trace in the seismic data may be shifted in time relative to the time that a seismic wave would have to travel from a deeper streamer to a shallower streamer, or vice versa, depending on the location of the virtual streamer.

At step 230, the computer application may separate a portion of the time-aligned seismic data into one or more summation contribution gathers. A summation contribution gather may be defined as a portion of the seismic data that may be added together and processed in a manner that would result in a single data trace that corresponds to the received seismic data. Thus, one summation contribution gather may result in only one output trace due to the summation. However, the summation contribution gathers may include seismic data that basically overlap each other, and as such, a single trace may appear in more than one of the summation contribution gathers.

A typical example of a summation contribution gather would be the common-midpoint gather of seismic data, which may result in a single stacked trace after a normal-moveout correction is applied to the individual traces of the common-midpoint gather. Alternatively, the stacking could be done over common reflection surface (CRS) gathers. Another example of a summation contribution gather would be all the data in the aperture of a Kirchhoff migration technique, which may be summed together after a migration moveout is applied to the individual traces of the gather.

In one implementation, the summation contribution gathers may be determined based on the purpose of the seismic data or how the seismic data will be processed. Typically, the seismic data is processed using a NMO processing technique or prestack imaging technique to generate an image of the subsurface. For example, if the seismic data will be processed according to a normal moveout (NMO) common midpoint stacking processing technique, then the summation contribution gather may be the common midpoint (CMP) gather because only the traces at the common midpoint may be summed together to provide one output trace per CMP gather.

Alternatively, if the seismic data will be processed using a prestack time or depth imaging process (e.g., prestack Kirchhoff migration), then the summation contribution gather may be much wider than the CMP gather. In this case, summation contribution gathers may include all of the traces within a migration aperture around each migrated output trace. The migration aperture corresponds to the spatial range of the seismic data evaluated in a seismic data processing calculation. In one implementation, the migration aperture may be several kilometers in diameter. Most of the traces within the migration aperture may not add to the migrated output trace because of destructive interference. Only those traces in the zones of constructive interference contribute to the seismic image.

By separating the seismic data into summation contribution gathers, the computer application may identify portions of the seismic data that may constructively interfere with each other (i.e., constructive interference zone). In one implementation, the constructive interference zone can be several 100 meters in diameter. The constructive interference zone may include portions of the seismic data that may be added together to generate seismic data that may represent all of the seismic data due to primarily up-going waves acquired by all of the receivers in the survey. For instance, seismic data acquired by a first set of receivers disposed at a first depth may experience sea-surface destructive interference at certain frequencies (e.g., 5-10 Hz). However, seismic data acquired by a second set of receivers may experience sea-surface destructive interference at frequencies (e.g., 50-60 Hz) that are different than that of the seismic data acquired by the first set of receivers. By summing the seismic data in the summation contribution gathers together, the resulting seismic data may use the seismic data at 50-60 Hz acquired by the first set of receivers to replace the seismic data at 50-60 Hz acquired by the second set of receivers. Similarly, the resulting seismic data may use the seismic data at 5-10 Hz acquired by the second set of receivers to replace the seismic data at 5-10 Hz acquired by the first set of receivers. In this manner, the portion of the seismic data acquired by each set of receivers that experienced destructive interference due to the sea-surface ghost waves may be replaced with seismic data that did not experience the destructive interference due to the sea-surface ghost waves.

Summation contribution gathers may be identified in the seismic data because the streamers are towed at different depths and in a slant angle with respect to the inline direction. The seismic data acquired by the streamer configurations described above with reference to FIGS. 1A-1I ensure that the cancellation frequencies where sea-surface ghosts destructively interfere with the up-going waves will be different for receivers disposed on each different streamer. Since the cancellation frequencies where sea-surface ghosts destructively interfere with the up-going waves will be different for receivers disposed on each different streamer, the seismic data acquired by the receivers at different depths may be used to fill in the seismic data that have been destructively interfered with by the sea-surface ghosts using the summation contribution gathers. In one implementation, the variable depth streamer survey may be designed such that each potential constructive interference zone of the imaging process contain an appropriate mix of traces from different depths such that information missing at one trace in this zone can be filled from trace with the sea-surface ghost notch at different frequencies.

At step 240, the computer application may sum the seismic data in the summation contribution gathers such that the resulting seismic data may have residual ghost wavelets without deep frequency notches (i.e., without sea-surface ghost waves that destructively interfere with the up-going waves), as described above. The sum of the seismic data in the summation contribution gathers may replace the portion of the seismic data acquired by each receiver that may have experienced destructive interference due to the sea-surface ghost waves.

In one implementation, if the seismic data is to be processed using a NMO stacking processing technique, the computer application may sum the traces in the common midpoint gather using a normal moveout (NMO) stacking process. Before NMO stacking may be performed, an NMO correction may be performed to remove timing errors from the seismic data. After NMO stacking, the residual ghost wavelet may correspond to the stacked ghost wavelet that does not hold deep amplitude notches at certain frequencies. However, the residual ghost wavelet may not be shaped as a single pulse-like wavelet, which is the optimum shape for the structural interpretation of seismic data. As such, the residual ghost wavelet may be modified to conform to the shape of a pulse. In one implementation, the residual ghost wavelet may be modified to conform to the shape of a pulse by assuming that the stacked ghost wavelet is a minimum-delay wavelet. For instance, a conventional deconvolution algorithm may be used to compress the residual ghost wavelet to a pulse.

In another implementation, if the seismic data will be processed using a prestack time or depth imaging process, the computer application may apply a Kirchhoff migration correction process to the traces in the summation contribution gathers to determine the sum of the traces in the summation contribution gathers. Before performing a Kirchhoff migration correction, a migration moveout correction may be performed to remove timing errors from the traces in the summation contribution gathers. After performing the Kirchhoff migration correction, the seismic data may include a residual ghost wavelet that consists mostly of summed actual ghost wavelets such that the summation is done over the zone of constructive interference of the migration summation operation.

By summing the seismic data in the summation contribution gathers as described in step 240, seismic data missing at one trace may be filled in using seismic data from a different trace. As a result, the computer application may obtain a more complete version of all of the acquired seismic data. Further, by summing the seismic data in the summation contribution gathers, the resulting seismic data may have attenuated or minimized various noise components embedded within the acquired seismic data.

At step 250, the computer application may apply a spectral shaping filter to the result of step 240. The spectral shaping filter may convert the residual ghost wavelet to a broad-band zero-phase pulse, thereby widening the spectrum of the seismic data. The filter used to widen the spectrum may modify the amplitude of the seismic data without altering the phase of the seismic data. In one implementation, the computer application may apply a zero-phase Wiener deconvolution filter to the result of step 240 to widen the seismic data summation spectrum. The Wiener deconvolution filter may compress the summed seismic data into a well defined pulse. As a result, the computer application may obtain a sub-surface image that approximates the image that would be achieved by imaging only up-going waves, without performing an explicit wavefield separation into up- and down-going waves.

Figure 3:
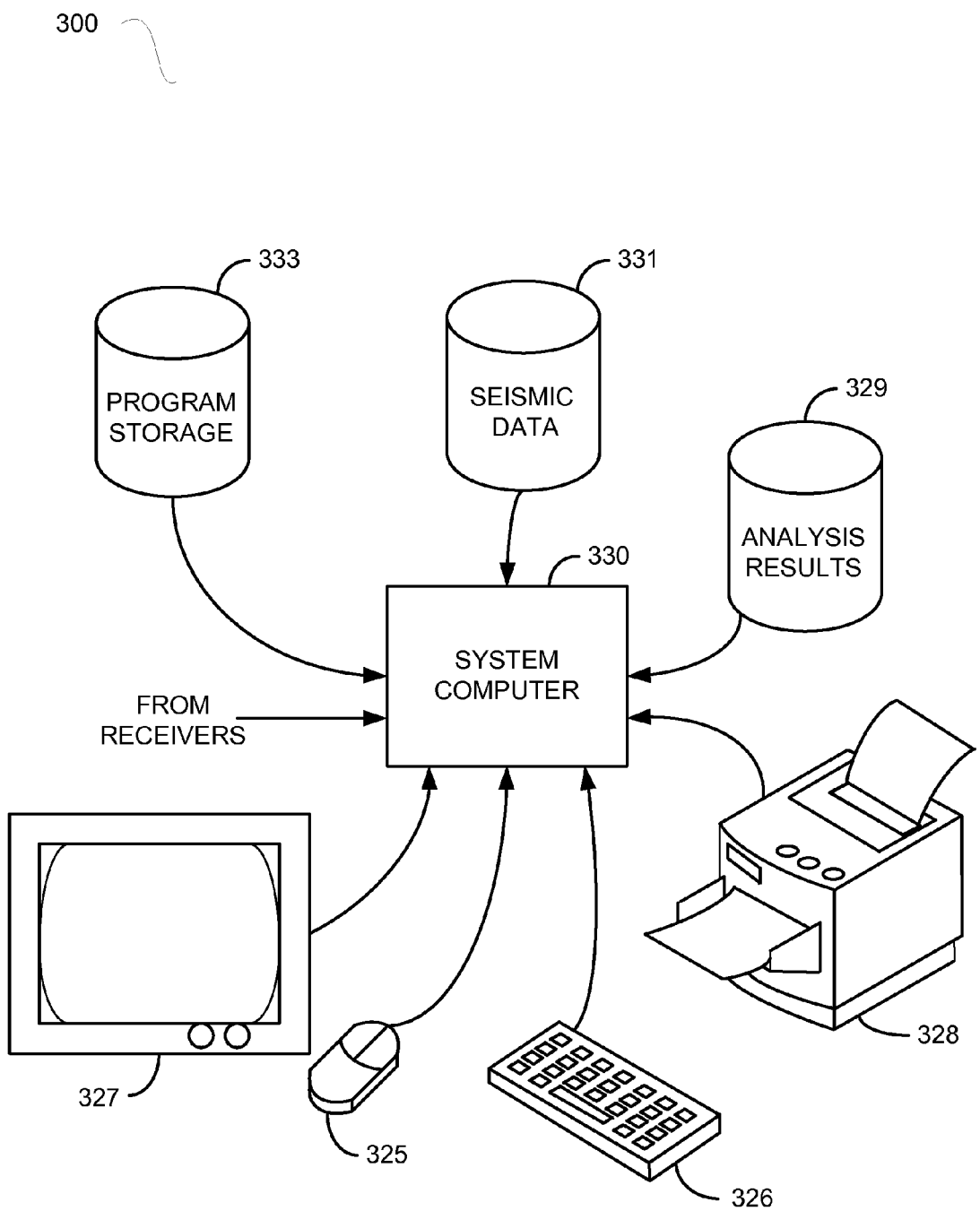
FIG. 3 illustrates a computer network into which implementations of various techniques described herein may be implemented.

FIG. 3 illustrates a computing system 300, into which implementations of various techniques described herein may be implemented. The computing system 300 (system computer) may include one or more system computers 330, which may be implemented as any conventional personal computer or server. However, those skilled in the art will appreciate that implementations of various techniques described herein may be practiced in other computer system configurations, including hypertext transfer protocol (HTTP) servers, hand-held devices, multiprocessor systems, microprocessor-based or programmable consumer electronics, network PCs, mini-computers, mainframe computers, and the like.

The system computer 330 may be in communication with disk storage devices 329, 331, and 333, which may be external hard disk storage devices. It is contemplated that disk storage devices 329, 331, and 333 are conventional hard disk drives, and as such, will be implemented by way of a local area network or by remote access. Of course, while disk storage devices 329, 331, and 333 are illustrated as separate devices, a single disk storage device may be used to store any and all of the program instructions, measurement data, and results as desired.

In one implementation, seismic data from the receivers may be stored in disk storage device 331. The system computer 330 may retrieve the appropriate data from the disk storage device 331 to process seismic data according to program instructions that correspond to implementations of various techniques described herein. The program instructions may be written in a computer programming language, such as C++, Java and the like. The program instructions may be stored in a computer-readable medium, such as program disk storage device 333. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 330. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 330 may present output primarily onto graphics display 327, or alternatively via printer 328. The system computer 330 may store the results of the methods described above on disk storage 1029, for later use and further analysis. The keyboard 326 and the pointing device (e.g., a mouse, trackball, or the like) 325 may be provided with the system computer 330 to enable interactive operation.

The system computer 330 may be located at a data center remote from the survey region. The system computer 330 may be in communication with the receivers (either directly or via a recording unit, not shown), to receive signals indicative of the reflected seismic energy. These signals, after conventional formatting and other initial processing, may be stored by the system computer 330 as digital data in the disk storage 331 for subsequent retrieval and processing in the manner described above. In one implementation, these signals and data may be sent to the system computer 330 directly from sensors, such as geophones, hydrophones and the like. When receiving data directly from the sensors, the system computer 330 may be described as part of an in-field data processing system. In another implementation, the system computer 330 may process seismic data already stored in the disk storage 331. When processing data stored in the disk storage 331, the system computer 330 may be described as part of a remote data processing center, separate from data acquisition. The system computer 330 may be configured to process data as part of the in-field data processing system, the remote data processing system or a combination thereof.

While FIG. 3 illustrates the disk storage 331 as directly connected to the system computer 330, it is also contemplated that the disk storage device 331 may be accessible through a local area network or by remote access. Furthermore, while disk storage devices 329, 331 are illustrated as separate devices for storing input seismic data and analysis results, the disk storage devices 329, 331 may be implemented within a single disk drive (either together with or separately from program disk storage device 333), or in any other conventional manner as will be fully understood by one of skill in the art having reference to this specification.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data, comprising:
receiving the seismic data acquired by at least two receivers that are disposed on different streamers at different depths;
time-aligning the seismic data;
collecting, using a processor, a portion of the time-aligned seismic data into a gather;
summing the collected time-aligned seismic data in the gather;
widening a spectrum of the sum; and
generating an image of subsurface formations in the earth based on the widened spectrum.

2. The method of claim 1, wherein time-aligning the seismic data comprises correcting for misalignment of the seismic data due to the at least two receivers being at the different depths.

3. The method of claim 1, wherein the time aligned seismic data represents seismic data acquired at a common depth.

4. The method of claim 3, wherein the common depth is at sea surface.

5. The method of claim 1, wherein time-aligning the seismic data comprises applying one or more time shift corrections to the seismic data acquired by each receiver such that the seismic data was acquired at a common depth.

6. The method of claim 1, wherein the gather is a common midpoint gather.

7. The method of claim 1, wherein the collected time-aligned seismic data is summed using a normal moveout (NMO) common midpoint stacking processing technique.

8. The method of claim 7, wherein using the NMO common midpoint stacking processing technique comprises performing an NMO correction on the collected time-aligned seismic data.

9. The method of claim 1, wherein the gather comprises one or more traces within a migration aperture that constructively interfere with each other.

10. The method of claim 1, wherein the collected time-aligned seismic data is summed using a prestack time or depth imaging process.

11. The method of claim 10, wherein the prestack time or depth imaging process is a Kirchhoff migration correction process.

12. The method of claim 10, wherein using the prestack time or depth imaging process comprises performing a migration moveout correction on the collected time-aligned seismic data.

13. The method of claim 1, wherein widening the spectrum comprises applying a spectral shaping filter to each summed seismic data.

14. The method of claim 1, wherein widening the spectrum comprises applying a zero-phase Wiener deconvolution filter to each summed seismic data.

15. A non-transitory computer-readable medium having stored thereon computer-executable instructions which, when executed by a computer, cause the computer to:
receive seismic data acquired by at least two receivers that are disposed on different streamers at different depths;
time-align the seismic data;
collect a portion of the time-aligned seismic data into a gather;
sum the collected time-aligned seismic data in the gather;
widen a spectrum of the sum; and
generate an image of subsurface formations in the earth based on the widened spectrum.

16. The non-transitory computer-readable medium of claim 15, wherein the computer-executable instructions that cause the computer to time-align the seismic data further comprises computer-executable instructions that cause the computer to apply one or more time shift corrections to the seismic data acquired by each receiver such that the seismic data was acquired at a common depth.

17. The non-transitory computer-readable medium of claim 15, wherein the collected time-aligned seismic data is summed using a normal moveout (NMO) common midpoint stacking processing technique.

18. The non-transitory computer-readable medium of claim 15, wherein the collected time-aligned seismic data is summed using a prestack time or depth imaging process.

19. The non-transitory computer-readable medium of claim 18, wherein the prestack time or depth imaging process is a Kirchhoff migration correction process.

20. A computer system, comprising:
a processor; and
a memory comprising program instructions executable by the processor to:
receive seismic data acquired by at least two receivers that are disposed on different streamers at different depths;
time-align the seismic data;
collect a portion of the time-aligned seismic data into a gather;
sum the collected time-aligned seismic data in the gather;
widen a spectrum of the sum; and
generate an image of subsurface formations in the earth based on the widened spectrum.

* * * * *